United States Patent [19]
Rafi-Zadeh

[11] Patent Number: 5,161,851
[45] Date of Patent: Nov. 10, 1992

[54] COVER ASSEMBLY FOR TRUCK BED

[76] Inventor: Hassan Rafi-Zadeh, 5301 E. Mockingbird La., Paradise Valley, Ariz. 85253

[21] Appl. No.: 675,319

[22] Filed: Mar. 26, 1991

[51] Int. Cl.[5] .............................. B60P 7/02; B60P 3/34
[52] U.S. Cl. ...................................... 296/100; 296/26; 296/165; 16/252; 16/361; 217/60 E; 292/263; 108/131
[58] Field of Search ................ 296/26, 100, 164, 165; 16/235, 242, 252, 357, 360, 361; 217/60 B, 60 E, 60 G; 292/263; 108/131

[56] References Cited

U.S. PATENT DOCUMENTS

| | | | |
|---|---|---|---|
| 1,352,379 | 9/1920 | Pounder | 16/361 |
| 1,525,059 | 2/1925 | Belk | 16/357 |
| 2,733,953 | 2/1956 | Nenadal | 296/100 |
| 3,567,315 | 3/1971 | Speer | 16/242 X |
| 4,206,939 | 6/1980 | Rowley, II | 292/263 |
| 4,613,181 | 9/1986 | Rafi-Zadeh | 296/100 |
| 4,856,841 | 8/1989 | Rafi-Zadeh | 296/100 |
| 4,893,863 | 1/1990 | Skonieczny et al. | 16/235 |

*Primary Examiner*—Dennis H. Pedder
*Attorney, Agent, or Firm*—Tod R. Nissle

[57] ABSTRACT

A cover assembly for the bed of a pickup truck includes a rigid cover which is mounted on the bed by a plurality of spring-loaded arms which allow the cover to be vertically moved between a stored, closed position and an open, extended position. The folding arms include adjustment means which permits the orientation of the arms in the closed position to be adjusted to a selected orientation. Counteracting springs are utilized to facilitate deployment of the cover assembly to the open, extended position.

3 Claims, 9 Drawing Sheets

COVER ASSEMBLY FOR TRUCK BED

This invention relates to a cover for the bed of a pickup truck.

More particularly, the invention relates to a pickup truck bed cover which is attached to a plurality of folding arms which connect the cover to the bed of the truck and which permit the cover to be stored in a closed, stored position over the truck bed and permit the cover to be raised upwardly away from the truck bed to an open, elevated position.

In a further respect, the invention relates to a pickup truck bed cover of the type described which facilitates installation of the cover on pickup trucks having beds of varying size and which reduces the muscular strength required to raise the cover from the truck bed.

The cover assemblies which are described in my earlier issued U.S. Pat. Nos. 4,673,209, 4,613,181 and 4,469,364 each provides improved means for equipping the bed of a pickup truck with a cover which can be maintained against the truck bed or which can be readily raised to a selected elevated position above the bed of the truck. Although the various improvements described in these earlier issued patents have been important, two problems have continued, at least in part, to exist. One of these problems is minimizing the strength required to lift the cover from the stored to the elevated position. While the tension spring 84 in my U.S. Pat. No. 4,673,209 facilitates raising of the cover, reducing the physical strength required to raise the cover is advantageous, especially for women utilizing the cover. The other problem is adapting the cover assembly for ready installation on any of a plurality of pickup trucks each having different sized beds and different sized ledges circumscribing the beds. In my U.S. Pat. No. 4,673,209, a one piece mounting bracket 50 is described which enables the cover to be attached either to the top or to the inside edge of the bed of a pickup truck. Even when this mounting bracket is utilized, the orientation of the folding arm in the closed, stored position can alter appreciably depending on the dimensions of the truck bed on which the cover assembly is installed. For example, in FIG. 3 of the drawings, the folded arm 26 is shown in its desired generally horizontal orientation when the cover assembly is in the closed storage position. Insuring that the arm is in the position of FIG. 3 when the cover is closed is imporatnt. If the folded arm tilts downwardly toward the bed of the pickup truck, access to the bed is impeded when the cover assembly is in the closed, stored position. If the folded arm tilts upwardly from the position of FIG. 3, it can impede the proper opening and closing of the cover. Moving the point of attachment of mounting bracket 50 laterally alters the orientation of the folded arm when the cover is in the closed position.

Accordingly, it would be highly desirable to provide a method and apparatus for adjusting the folded orientation of an arm 26 after the mounting bracket 50 of the arm is attached to the bed of a pickup truck.

It would also be highly desirable to provide an improved cover assembly for a pickup truck bed which facilitates lifting of the cover from the closed storage position to the open position.

Therefore, it is a principal object of the invention to provide an improved cover for the bed of a pickup truck.

Another object of the invention is to provide an improved pickup truck bed cover of the type including a plurality of folding arms attached to the ledge of the bed to permit the cover to be lifted from a closed, stored position against the bed ledge to a raised position with the arms supporting the cover above the truck bed.

A further object of the invention is to provide an improved pickup truck bed cover of the type described which enables the position of the folding arms relative to the cover when the cover is in the closed, stored position to be readily adjusted after the lower end of each folding arm has been secured to the upper ledge of the wall circumscribing the bed of the truck.

Still another object of the invention is to provide an improved pickup truck bed cover of the type described which minimizes the physical strength required to raise the cover from the stored to the raised position.

These and other, further and more specific objects and advantages of the invention will be apparent to those skilled in the art from the following detailed description thereof, taken in conjunction with the drawings, in which:

Briefly, in accordance with my invention, I provide a vertically extendible cover assembly for use on the bed of a pickup truck, comprising, in combination, a rigid cover; a plurality of folding arms each having a lower base leg and an upper extending leg, said legs each including an upper end and a lower end, the upper end of the base leg being pivotally attached to the lower end of the extending leg; bracket means attached to each of the lower ends of the base legs to attach the lower end to the upper ledge means of the pickup truck bed; mounting means for securing each of the upper ends of the extending leg to the cover, the mounting means including a foot pivotally attached to the upper end of the extending leg, sleeve means fixedly attached to the upper end of the extending leg, sleeve means fixedly attached to the cover to slidably receive the foot to permit the foot to be slidably laterally positioned at a selected position in the sleeve, and attachement means for fixedly securing the foot in the sleeve in the selected position, each of the folding arms being movable between first and second operative positions when the attachement means fixedly secures the foot in the selected position. The first operative folded position of the folding arm is with the cover in a lowered position on the pickup bed and with the leg extending from the ledge means inwardly into the pickup truck bed. The second operative folded position of a folding arm is an unfolded extended position with the cover raised from the pickup truck bed and the legs of the arm extending upwardly from the ledge mean to the cover. The cover assembly can include a first tension spring and a second tension spring. The first tension spring has one end attached to the upper leg intermediate the upper and lower ends thereof, and a second end attached to one of the first group consisting of the lower end of the base leg, the bracket means, and the pickup truck bed. The second tension spring has one end attached to the upper leg intermediate the upper and lower ends thereof, and has a second end attached to one of the second group consisting of the mounting means and the cover. When the arm is in the first operative position, the first spring extends from the upper leg inwardly into the bed, around the pivot point, and from the pivot point outwardly to said one of the first group. The second spring generates forces which act in directions opposing forces generated by the first spring and generates forces which act against the pivot point to facilitate movement of the arm from the first to the second operative position.

Figures 1, 2, 3, 4:
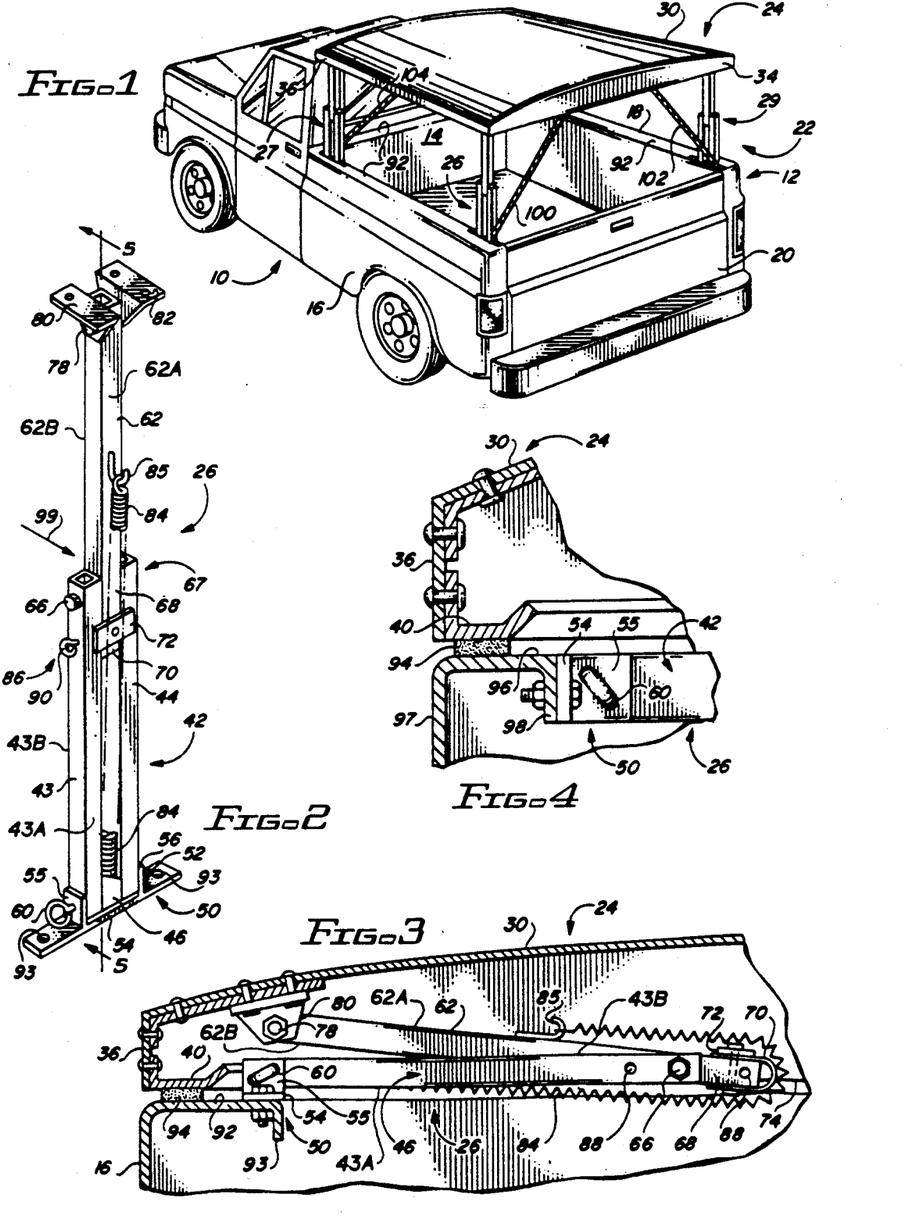
FIG. 1 is a perspective view illustrating a pickup truck having the cover assembly of the invention installed thereon.
FIG. 2 is a perspective view illustrating one of the folding arms of the cover assembly of FIG. 1.
FIG. 3 is a section view of the cover assembly of FIG. 1 illustrating one of the arms of FIG. 2 in the folded position when the cover assembly of FIG. 2 is lowered to a closed storage position adjacent the ledge of the bed of the pickup truck.
FIG. 4 is a section view of the cover assembly of FIG. 1 illustrating an alternate method of attaching the arm of FIG. 2 to the upper ledge of the wall of the bed of the pickup truck.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a pickup truck 10 including bed 12. The bed 12 is provided with front panel 14, opposed side panels 16 and 18 and tail gate 20. In FIG. 1 the cover assembly of the invention is mounted on bed 12. The cover assembly is indicated by reference character 22. Cover assembly 22 includes a rigid cover structure 24 and four spring-loaded folding arms 26, 27, 28 and 29. Arms 26 to 29 connect cover 24 to bed 12.

Rigid cover structure 24 can be rectangular or any other desired configuration. Cover 24 includes top panel 30 having a depending front panel 32, depending back panel 34, and opposed side panels 36 and 38. Each of panels 32, 34, 36 and 38 has a lip 40 formed on its lower end to extend inwardly from the periphery of cover 24. These lips 40 may be formed by attaching a right angle member in the manner shown in FIGS. 3 and 4.

In the presently preferred embodiment of the invention, each arm 26, 27, 28 and 29 is identical to the other of said arms. Each arm 26–29 can have a structure different from the other arms 26–29.

Figures 5, 6:
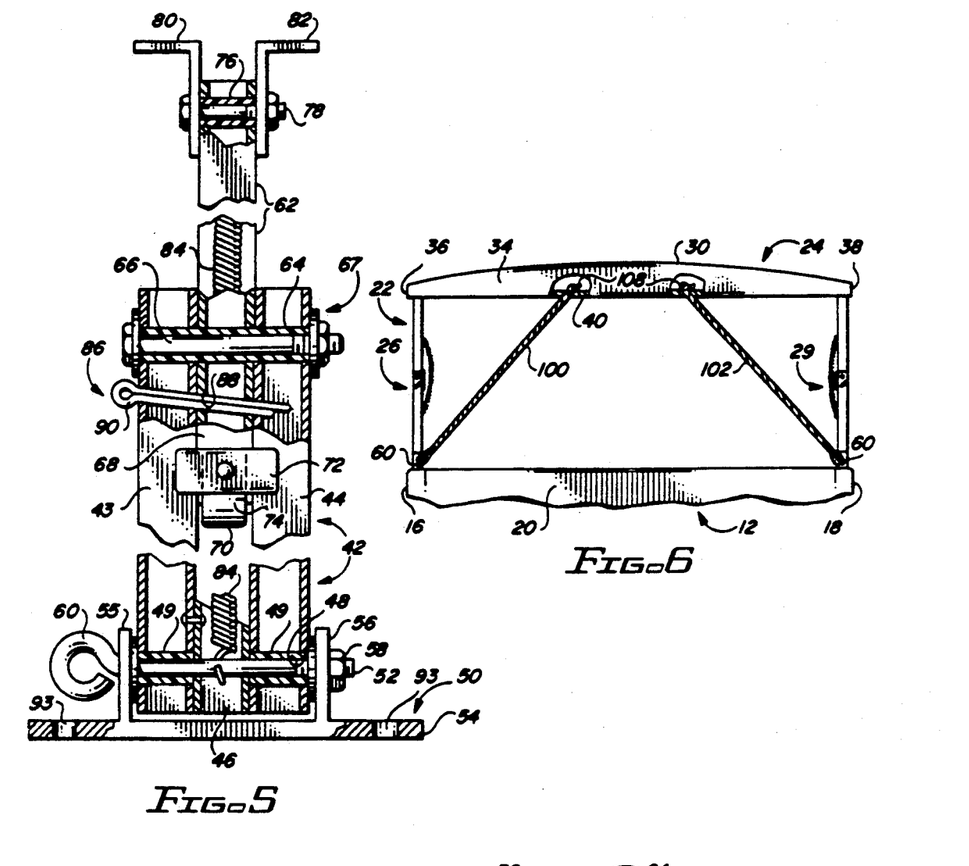
FIG. 5 is a section view of the folding arm of FIG. 2 taken along sectin line 5—5 thereof.
FIG. 6 is a rear elevation view of the raised cover assembly of FIG. 1 illustrating construction details thereof.

Folding arm 26 is illustrated in FIGS. 2, 3 and 5 and includes a bifurcated base leg 42 having coextending spaced apart tines or legs 43 and 44 which are interconnected at their aligned lower ends by a tubular spacer 46. The aligned lower ends of the tines or legs 43 and 44 and the spacer 46 are provided with a transverse aperture 48 having suitable bushings 49 therein. A special one piece mounting bracket 50 is pivotally connected to the lower end of base leg 42 by means of a pivot pin 52. Bracket 50 has a planar plate 54 having a spaced apart pair of lugs 55 and 56 extending normally therefrom and having apertures formed therethrough. The lower end of the base leg 42 is located between the lugs 55 and 56 and the pivot pin 52 passes through the aligned apertures of the lugs and the transverse aperture 48 of the base leg so as to provide a pivot joint. The pivot pin 52 has a threaded end and a suitable nut 58 is threadingly attached thereto to hold the pivot pin in place. Also, the pivot pin 52 has a ring-shaped head 60 at its opposite end.

The aligned opposite upper ends of tines 43 and 44 have an extending leg 62 mounted therebetween. An aperture is formed transversely through the upper ends of tines 43, 44 and through extending leg 62. Bushing 64 is mounted in the aperture. A pivot pin or bolt 55 extends through bushing 64 and is secured in place by a suitable nut. In this manner, folding arm 26 is provided with a pivot joint means 64 between the base leg 42 and the extending leg 62.

Extending leg 62 has a lower end portion 68 which extends from the pivot joint 67 downwardly between the tines 43 and 44 of the base leg 42. An arcuate bearing head 70 is mounted on the lowermost end of the lower end portion 68 of extending leg 62, and a transverse stop plate 72 is mounted in spaced relationship with that lowermost end. The transverse stop plate 72 is configured to extend laterally and oppositely beyond the opposite sides of the extending leg 62 so as to be moved into bearing engagement with tines 43 and 44 when the folding arm 26 is moved from its folding position to its extended position and to thereby prevent movement beyond its extended position. The arcuate bearing head 70 extends axially from the end of the extending arm 62 to provide a semi-circular curved surface 74 on the end of the extending arm.

A suitable bushing 76 is disposed in a transverse aperture formed in the upper end of the extending arm 62 and a suitable nut and bolt assembly 78 is mounted in the bushing to hold a pair of right angle mounting flanges 80 and 82 on the opposite sides of the extending arm 62. The mounting flanges 80, 82 are thereby pivotally carried on the upper end of the extending arm 62 and are employed for connecting the folding arm 26 to cover structure 24.

Bushings 49, 64 and 76 can be formed of a self-lubricating material such as nylon.

Spring 84 urges arm 26 to its extended position. The lower end of spring 84 is attached in tubular space 46. For example, in FIG. 5, the lower end of spring 84 is hooked to the shank of pivot pin 52. The upper end of spring 84 is attached to leg 62 intermediate the ends thereof by hook 85. Spring 84 extends between leg 42 and leg 62 and has an intermediate portion in bearing engagement with the transverse stop plate 72 when the folding arm 26 is in either its extended position or its folded position.

Locking means 86 is provided for selectively locking the folding arm 26 in its extended position. As shown in FIG. 5, a blind aperture 88 is formed through tine 43, through the lower end 68 of the extending leg 62, and half way through tine 44. When folding arm 26 is extended, the various holes of blind aperture 88 are in alignment and the aperture slopes downwardly at an acute angle with respect to the flange 57 of the one piece mounting flange 50. Cotter pin 90 can be inserted in aperture 88 to lock arm 26 in the extended position.

In FIG. 3, bracket 50 or arm 26 is mounted on the innermost edge of upper horizontal ledge 92 of side panel 16 of bed 12. Bracket 50 is mounted with bolts or other means. Planar plate 54 of bracket 50 includes apertures 93 at each end to facilitate the mounting of bracket 50 with bolts. In FIG. 3, lugs 55 and 56 extend upwardly from bracket 50. The orientation of bracket 50 in FIG. 3 is preferred on full size pickup trucks.

When cover assembly 22 is mounted in mini-pickup trucks, flange 50 is attached in the manner shown in FIG. 4. Flange 50 is attached to inner vertical edge of upper ledge 96 of the side panel 97 of the mini-pickup truck by being bolted to lip 98.

The right angle mounting flanges 80 and 82 of arm 26 are connected to the underside of top panel 30 of cover 24 by rivets as shown in FIG. 3.

Cover assembly 22 includes means for stabilizing the cover in a direction transverse to the longitudinal dimension of truck 12. This transverse stabilizing means comprises a first pair of stringers 100 and 102 at the rear end of the cover assembly and a second pair of stringers 104 and 106 at the front end thereof. In FIG. 6, the first pair of stringers 100 and 102 have their lower ends attached to heads 60 of pivot pins 52 of folding arms 26 and 29, respectively. The upper ends of stringers 100 and 102 pass through apertures formed through lip 40 of panel 34 of cover 24. The upper ends of stringers 100, 102 are knotted 103 or otherwise secured in place.

Figure 7:
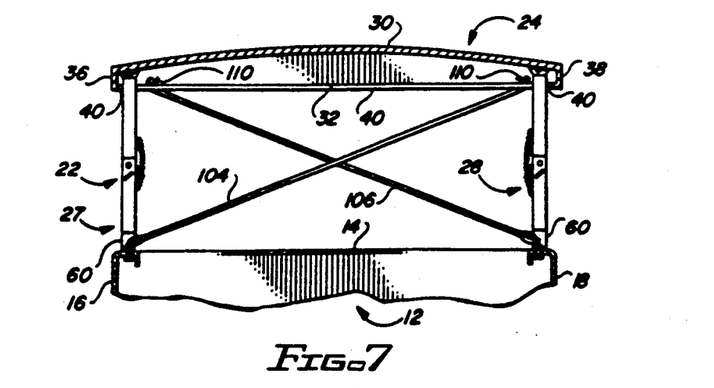
FIG. 7 is a front elevation view of the cover assembly of FIG. 1 illustrating an alternate embodiment thereof.

In FIG. 7, the second pair of stringers 104 and 106 have their lower ends attached to heads 60 of pins 52 of arms 27, 28, respectively. The upper ends of stringers 104 and 106 are attached to panel 32. The upper ends of stringers 104 and 106 pass through apertures in lip 40 of panel 32 and are knotted 110 or otherwise secured.

Operation of the cover assembly of FIGS. 1 to 7 is known to those of skill in the art and is described in my issued U.S. Pat. No. 4,673,209, which is incorporated herein by reference.

Figures 8, 9, 10, 11, 12A, 12B, 13:
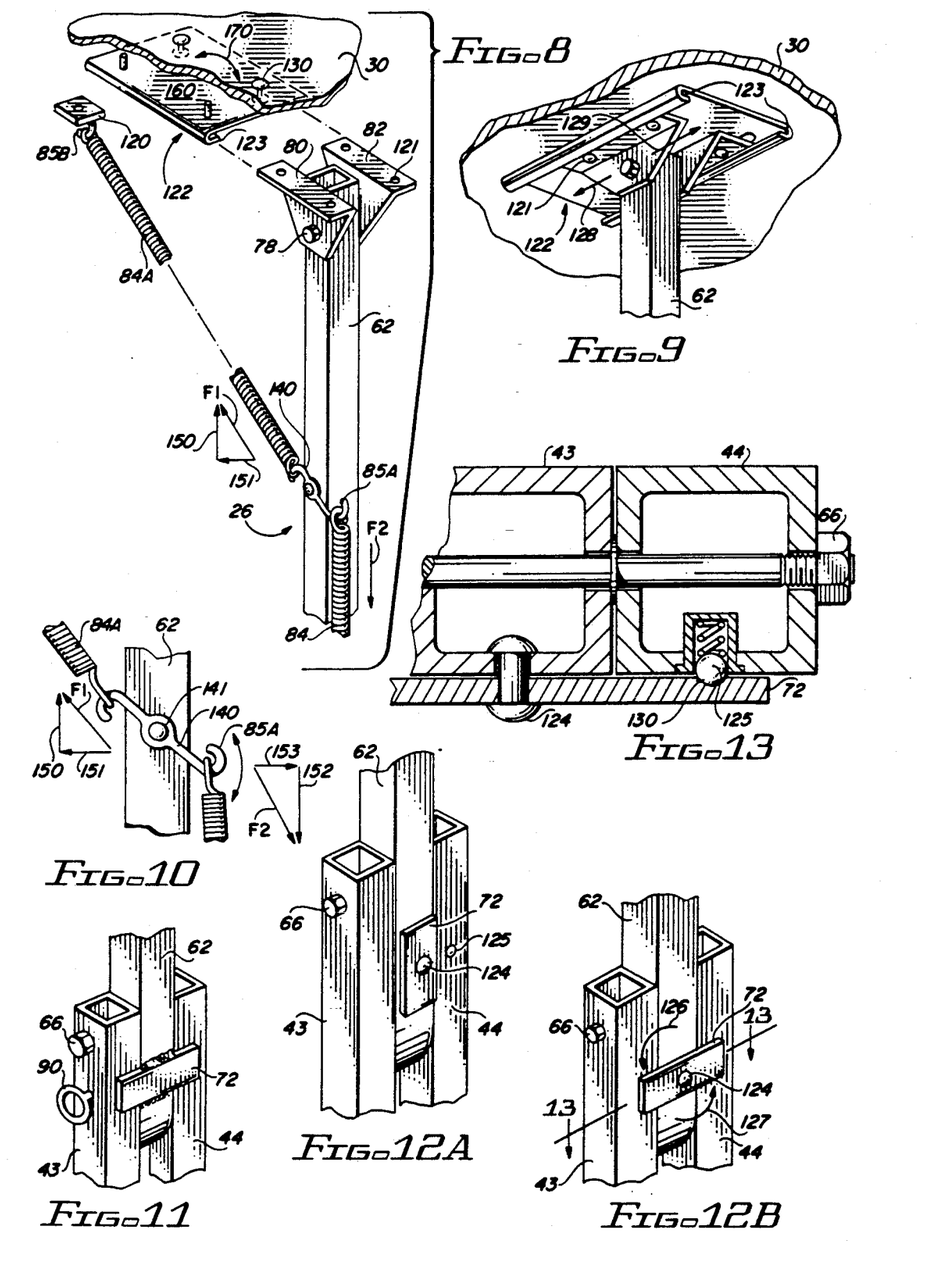
FIG. 8 is a perspective view illustrating an alternate embodiment of the invention.
FIG. 9 is a perspective view illustrating the mode of operation of the embodiemnt of the invention illustrated in FIG. 8.
FIG. 10 is a side view of a portion of the apparatus of FIG. 8 illustrating opposing tension springs utilized to move a folding arm from the closed stored position illustrated in FIG. 3 to the open extended position illustrated in FIGS. 2, 8 and 9.
FIG. 11 is a perspective view of the stop plate utilized on the arm assembly of FIG. 2.
FIGS. 12A and 12B are perspective views illustrating an alternate embodiment of the stop plate of FIG. 11.
FIG. 13 is a section view of the stop plate assembly of FIG. 12B taken along section line 13—13 thereof.

In the embodiment of the invention illustrated in FIGS. 8 and 9, a sleeve 122 is attached to panel 30 with rivets 130 or other fastening means. Sleeve 122 is attached to the underside of panel 30 in the general location at which flanges 80 and 82 are shown attached in FIGS. 1 and 3. Inturned U-shaped lips 123 of sleeve 122 are shaped and dimensioned to slidably receive flanges 80 and 82. Flanges 80 and 82 comprise a foot attached to the upper end of extending arm 62. Flanges 80 and 82 are pivotally attached to arm 62 by bolt 78 or other fastening means. As illustrated in FIG. 9, the foot can be slidably laterally adjusted in the directions indicated by arrows 128 and 129 to a selected position in sleeve 122. The directions indicated by arrows 128 and 129 are generally perpendicular to the longitudinal axis of truck 10. Once flanges 80 and 82 are adjusted to the selected position, bolts or rivets and can inserted through apertures 121 in flanges 80 and 82 to secure flanges 80 and 82 to panel 30. Utilization of the apparatus of FIGS. 8 and 9 is important because it permits the folded horizontal orientation of arm 26, illustrated in FIG. 3, to be readily adjusted upwardly and downwardly after bracket 50 has been secured to the upper ledge of the bed of a pickup truck. This orientation is important because when the arms 43, 44, 62 are orientated downwardly from the position of the arms shown in FIG. 3, then legs 43, 44 and 62 interfere with use of the bed of the truck to store materials. When the legs 43, 44 and 62 angle upwardly from the position illustrated in FIG. 3, then they may contact panel 30 and interfere with opening and closing of the cover 24. As would be appreciated by those of skill in the art, once mounting bracket 50 is secured to the ledge of the bed of a pickup truck, adjustment of flanges 80 and 82 in the directions indicated by arrows 128, 129 will determine the orientation of the legs of arm 26 when arm 26 is in the folded position of FIG. 3.

In use, the mounting bracket 50 for each arm 26 to 29 is secured to the ledge of the bed of a pickup truck in the manner illustrated in FIG. 3 or in FIG. 4. The sleeves 122 for the flanges 80, 82 on each of arms 26 to 29 are then attached to the underside of panel 30 at the corners thereof. The flanges for each arm 26 to 29 are slidably inserted the appropriate sleeve 122 and moved to a selected position. Flanges 80 and 82 are temporarily secured in fixed position in sleeve 122. Cover 24 is lowered to the closed position of FIG. 3 and the orientation of legs 62, 43, 44 is checked to insure each arm is in the preferred horizontal orientation. This preferred orientation is typically the orientation shown in FIG. 3, but can vary. If the orientation of the arm 26 to 29 is not correct, cover panel 30 is raised to the position of FIG. 1, flanges 80 and 82 are loosened and slidably adjusted in the direction of arrow 128 and/or 129 to a new selected position. Flanges 80 and 82 are again temporarily secured in fixed position in sleeve 122. The cover assembly is then lowered to the closed position of FIG. 3 and the orientation of the legs 62, 43, 44 of each arm 26 to 29 is checked. This procedure is repeated until the orientation of each arm is acceptable. Once the orientation of an arm 26 to 29 is acceptable, flanges 80 and 82 are fixedly secured to sleeve 122 and panel 30.

In FIG. 8 anchor 120 is attached to panel 30, panel 36, or sleeve 122 such that the longitudinal vertical axis of leg 62, the vertical longitudinal axis of spring 84, and the sloped longitudinal axis of spring 84A each generally lie in a common vertical plane. The lower end of tension spring 84A is connected to S-hook unit 140. The upper end of spring 84A is connected to hook 85B of anchor 120. The upper end of spring 84 is connected to hook 85A of S-hook 140. Although not seen in FIGS. 8 and 9, the structure of legs 43 and 44, bracket 50, plate 72, bolt 66, pin 90 etc. is identical to the structure shown in FIG. 2. In other words, the lower structure of arm 26 not shown in FIGS. 8 and 9 is shown in FIG. 2.

Spring 84A is tensioned when the arm 26 is in the closed position of FIG. 3 or is in the open position of FIGS. 8 and 2. Spring 84A produces a force F1 on unit 140 and leg 62. F1 includes force components 150 and 151. When arm 26 is in the open extended position of FIG. 8, spring 84 produces force F2 acting on unit 140 and leg 62. Force F2 includes components 153 and 152. Force 151 counteracts and is significantly greater than force 153. Force 150 counteracts force 152. Unit 140 is pivotally attached to leg 62 by pin 141. If desired, hooks 85 or other means can be used in place of S-unit 140 to secure springs 84 and 84A to leg 62.

In FIG. 10, arm 26 is in the extended, open position and the magnitude of force 151 is larger than the magnitude of force 153. When arm 26 is in the closed position of FIG. 3, then the magnitude of force 153 is larger than that of force 151. In FIGS. 8 and 10, the magnitude of vertical force component 150 is typically greater than the magnitude of horizontal force component 151. When the arm 26 is in the close position of FIG. 3, the magnitude of force component 151 is greater than the magnitude of force component 150. In FIG. 3, spring 84 extends around bearing head 70 and imparts a horizotnal inward force against head 70 which tends to force head 70 toward bracket 50. Consequently, when a user lifts panel member 36 upwardly to raise cover 24 from the stored position of FIG. 3 to the open position of FIG. 1, forces 150, 151 and the horizontal inward force acting on head 70 tend to force arm 26 inwardly and upwardly from the stored position of FIG. 3.

Since spring 84A counteracts spring 84, the utilization of spring 84A might, on initial consideration, not appear to facilitate operation of the cover assembly of the invention. Spring 84A does, however, significantly reduce the strength required to upwardly lift cover 24 from the stored position of FIG. 3. Force 150 also assists in stabilizing arm 26 in the open, extended position. As a result, even though the forces generated by spring 84A counteract forces 153 and 152 generated by spring 84, such counteracting forces improve and do not adversely affect operation of the cover assembly.

In FIGS. 2 and 11, stop plate 72 is fixedly secured to leg 62. As illustrated in FIGS. 12 and 13, plate 72 can be pivotally attached to leg 62 with a fastener 124. Aperture 130 formed on the inner surface of plate 72 receives spring loaded bearing 125 to movably maintain plate 72 in the position shown in FIG. 12B. Plate 72 can be rotated about fastener 124 in the directions indicated by arrows 126 and 127.

Rigid cover structure 24 can comprise a unitary piece of plastic or metal, can comprise a wood frame or other frame covered by canvas, or can comprise any other structure which generally maintains the distance between arms 26 to 29 when the cover is in the rasied, deployed position.

Sleeve 122 can be initially rotatably attached to cover 30 with a rivet or other fastener which extends through sleeve 122 at point 160 and permits sleeve 122 to be rotated about point 160 in the directions indicated by arrows 170. After the orientation of sleeve 122 on cover 30 is selected by rotating sleeve 122 about point 160 to a selected position, rivets 130 or other fastening means can be used to secure sleeve 122 in fixed position.

Figure 14:
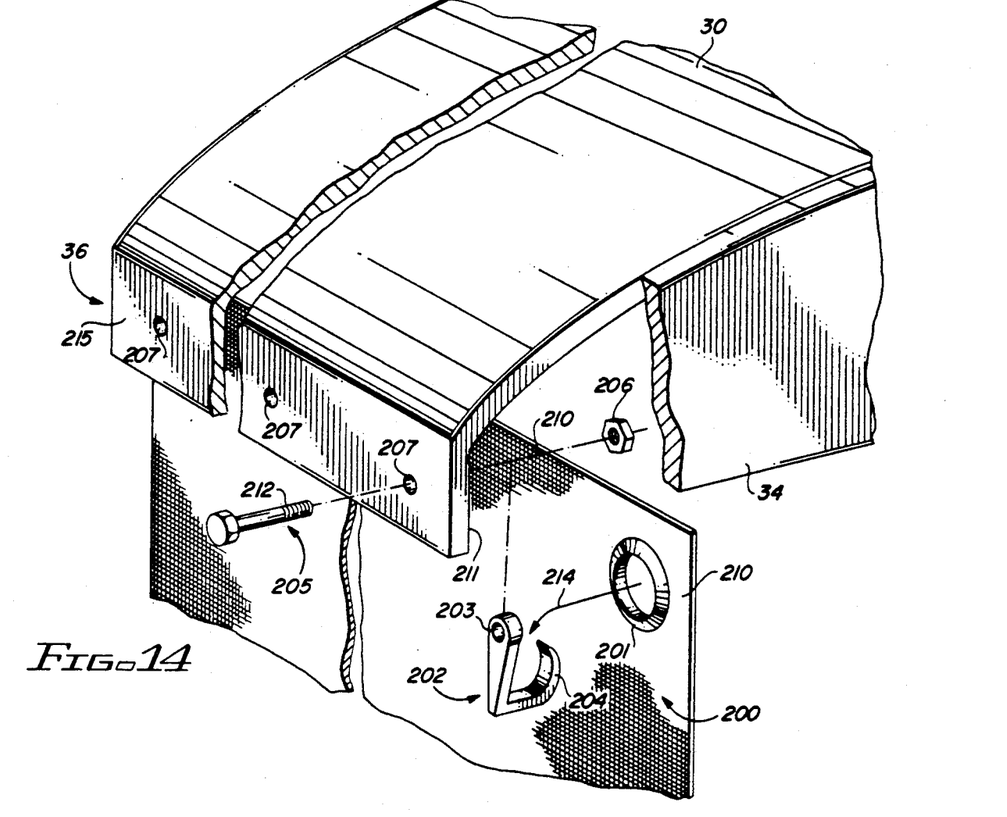
FIGS. 14 and 15 are prespective views illustrating a tent assembly utilized in the invention.
Figure 15:
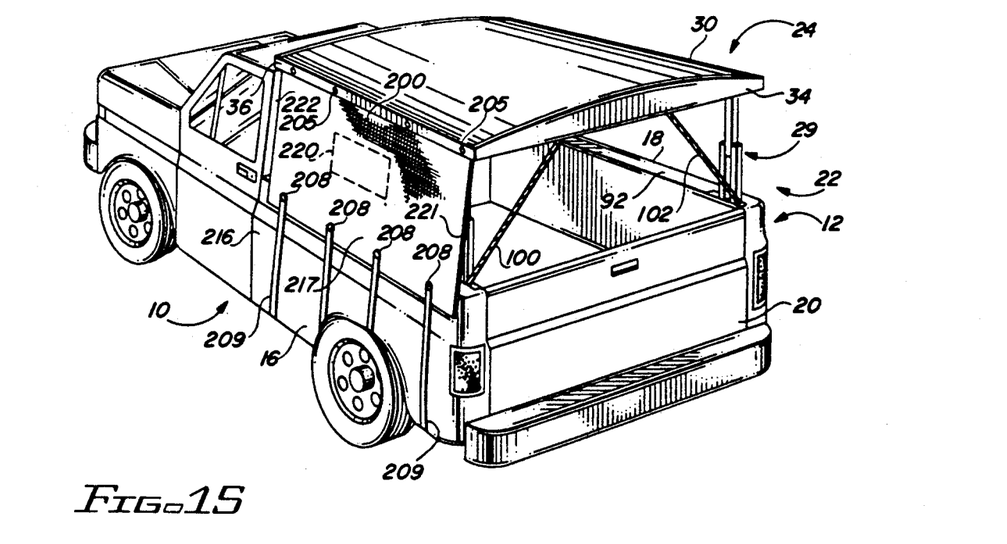

FIGS. 14 and 15 illustrate how the pickup bed cover of the invention is adapted to form a tent-type enclosure a the pickup bed. Spaced apart apertures 207 are formed through side panels 36 and 38, end panel 34 and front panel 32. For the sake of simplicity, in FIGS. 14 and 15 the apertures 207 are only shown as being formed through side panel 36, it being understood that the remaining panels 38, 32, 34 can be similarly adapted. A bolt 205 and internally threaded nut 206 are provided for use in conjunction with each aperture 207. Hook 202 is shaped and dimensioned to receive the eyelet 201 of a pliable fabric sheet 200. Fabric sheet 200 can comprise canvas, a rubber tarp, a plastic sheet, a sheet of woven wool or burlap material or other pliable sheet materials. Ordinarily, however, a water resistant canvas material is utilized. A plurality of spaced apart eyelets 201 is formed along the upper edge portion 210 of pliable sheet 200. The threaded end of each bolt 205 is passed through an aperture 207 and through the eyelet 203 of a hook 202 positioned adjacent the inner surface 211 of panel 36. Eyelet 203 is colinear and aligned with aperture 207. Internally threaded nut 206 is turned onto the threaded end 212 of bolt 205 to secure hook 202 against rectangular elongate inner surface 211. The eyelet 201 of pliable sheet 200 is placed over point 204 of hook 202 in the manner indicated by arrow 214 in FIG. 14. The spacing between eyelets 201 formed along edge portion 210 generally corresponds to the spacing between apertures 207 formed along panel 36. Each eyelet 201 is placed over the point 204 of a hook 202 secured to the inner surface 211 of panel 36 by a bolt-nut 205, 206. The inner surface 211 faces the bed of the pickup truck. The outer rectangular surface 215 of panel 36 faces outwardly from the bed of the pickup truck.

In FIG. 15 each eyelet 201 has been installed over the point 204 of a hook 202 secured to the inner surface 211 of panel 36. Any other fastening means can be used to secure edge 210 to inner surface 211. Pliable sheet 200 extends downwardly from panel 36 over a side wall 216 of the truck. Eyelets 208 are formed through the lower edge portion 217 of sheet 200. A strap 209 extends from each eyelet 208 to an anchor point on the side wall or undercarriage of the truck. Straps 209 tension sheet 200. Straps 209 can, if desired, be elastic.

An aperture 220 (FIG. 15) can be cut through sheet 200 to form a window. Aperture 200 can be covered with a sheet of plastic, glass, or other transparent material. When pliable sheets 200 are simultaneously hung downwardly from panels 32, 34, 36, 38, the panels can be interconnected at their adjacent continuous strip of fabric circumscribing the pickup bed and attached to panels 32, 34, 36, and 38.

Figure 16:
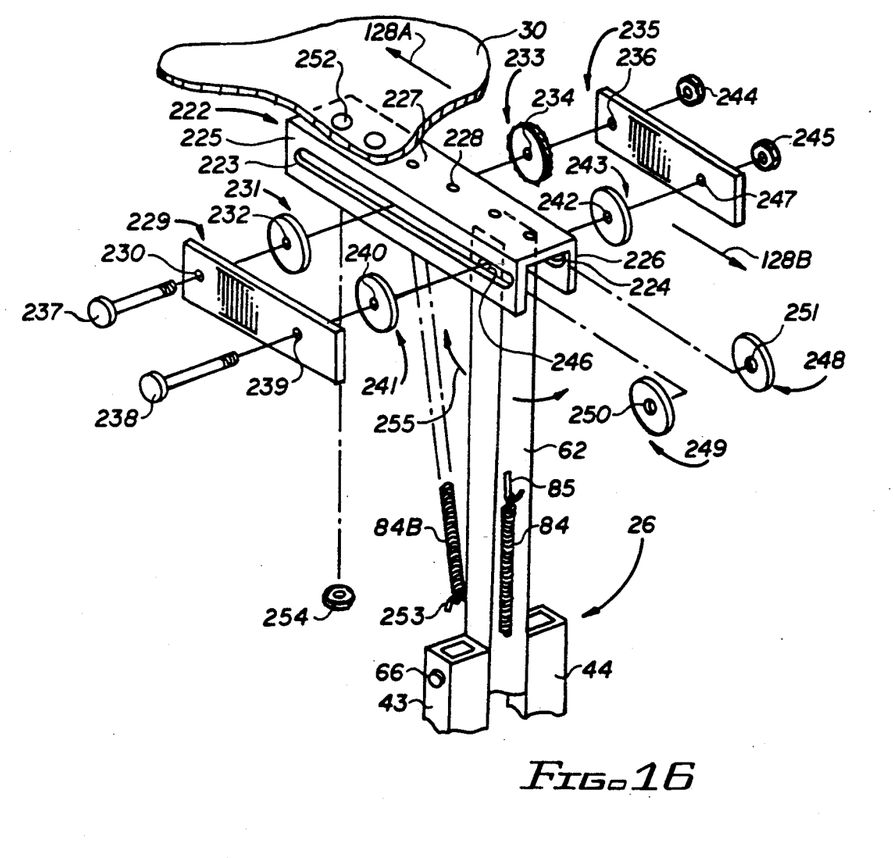
FIG. 16 is a perspective view illustrating another embodiment of the invention.
Figure 17:
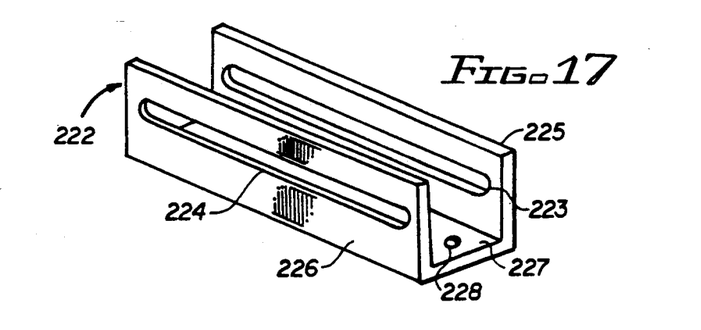
FIG. 17 is a perspective view illustrating a bracket used in the embodiment of the invention of FIG. 16.

The embodiment of the invention illustrated in FIGS. 16 and 17 is utilized to replace flanges 80, 82 and sleeve 122 in FIG. 8. The upper end of leg 62 is slidably secured between flanges 225, 226 of U-shaped bracket 222. Flanges 225, 226 outwardly depend from base 227. The externally threaded stem of bolt 238 passes through aperture 239 in plate 229, through aperture 240 in smooth fiber washer 240, through slot 223, through aperture 246 formed through the upper end of arm 62, through slot 224, through aperture 242 formed through smooth fiber washer 243, through aperture 247 formed through plate 235, and into lock nut 245. The externally threaded stem of bolt 237 passes through aperture 230 formed through plate 229, through aperture 232 formed through lock washer 231, through slot 223, through the upper hook end (not visible) of spring 84B, through slot 224, through aperture 234 formed through lock washer 233, through aperture 236 formed through plate 235, and into lock nut 244. If desired, smooth fiber washer 249 can be placed intermediate the upper end of leg 62 and flange 225, in which case the externally threaded stem of bolt 238 would also pass through aperture 250. Smooth fiber washer 248 can also, if desired, be place intermediate the upper end of arm 62 and flange 226, in which case the externally threaded stem of bolt 238 would also pass through aperture 251.

Rivets or bolts 252 pass through panel 30 and apertures 228 to secure bracket 22 to the underside of panel 30. If extending leg 62 is part of the folding arm 26 of FIG. 1, then U-shaped bracket 22 is mounted on the underside of panel 30 such that arrow 128A in FIG. 16 is perpendicular to and points toward panel 36 of cover 24. Arrows 128A and 128B indicate the directions in which the upper end of leg 62 can slide between flanges 225 and 226. Arrows 128A and 128B are parallel to flanges 225, 226, to the line along which apertures 228 lie, and to the longitudinal axis of bracket 222. Hook 253 is connected to leg 62. The lower end of spring 84B is attached to hook 253. As noted, the upper end of spring 84B is attached to the portion of the stem of bolt 237 which extends between flanges 225, 226. Each rivet 252 which secures bracket 222 to panel 30 includes a bottom portion 254. When the apparatus of FIG. 16 is assembled, bolts 237 and 238 secure plate 229 and washers 231, 241 adjacent flange 225, and, also secure plate 235 and washers 233 and 243 adjacent flange 226. If bolts 237, 238 are not fully tightened, but are only loosely inserted through plates 229, 235 and slots 223 and 224, then arm 62 can be grasped and the upper end of leg 62 slid between flanges 225, 226 in the direction of arrows 128A, 128B. When the upper end of leg 62 is slid in the direction of arrow 128A (or 128B) plates 229 and 235, bolts 237 and 238, and washers 233, 243, 231, 241 all simultaneously slide with the upper end of leg 62.

Utilization of the apparatus of FIG. 16 is important because it permits the folded horizontal orientation of arm 26, illustrated in FIG. 3, to be readily adjusted upwardly and downwardly after bracket 50 has been secured to the upper ledge of the bed of a pickup truck. This orientation is important because when the legs 43, 44, 62 are oriented downwardly from the position of the legs shown in FIG. 3, then legs 43, 44 and 62 interfere with use of the bed of the truck to store materials. When the legs 43, 44 and 62 angle upwardly from the position illustrated in FIG. 3, then they may contact panel 30 and interfer with opening and closing of the cover 24. As would be appreciated by those of skill in the art, once mounting bracket 50 is secured to the ledge of the bed of a pickup truck, sliding the upper end of leg 62 along the longitudinal axis of bracket 222 to a selected position between flanges 225 and 226 will determine the vertical position or elevation of the legs of arm 26 with respect to the floor of the bed of the pickup truck when arm 26 is in the folded position of FIG. 3. Another important advantage of the apparatus of FIG. 16 is that when the cover 24 is being constructed, bracket 222 can be fixedly secured to the underside of the cover at a selected position. The upper end of leg 62 is then slidably secured in bracket 222 using the plates 229 and 235, bolts 237 and 238 and the washers illustrated in FIG. 16. After bracket 50 is utilized to secured folding arm 26 to the ledge of the bed of a pickup truck in the manner illustrated in FIG. 1, bolts 237 and 238 and the upper end of leg 62 can, if necessary, be slid into a new position in bracket 222. Once the upper end of leg 62 is slid to its desired position in bracket 222, nuts 244 and 245 are tightly turned onto the ends of bolts 237 and 238, respectively, to fixedly secure bolts 237 and 238 in position on bracket 222. Tightening nut 244 on the end of bolt 237 squeezes plates 229 and 235 against lock washers 233 and 231 and prevents plates 235 and 229 from sliding along flanges 226 and 225 in the directions indicated by arrows 128A and 128B. Lock washer 234 locks inwardly against flange 226 and locks outwardly against plate 235. Lockwasher 231 locks inwardly against flange 225 and outwardly against plate 229. When nuts 244 and 245 are tightly turned onto the ends of bolts 237 and 238 and the upper end of leg 62 cannot slide along bracket 22 in the direction of arrow 128A or 128B, leg 62 can still pivot about bolt 238 in the manner indicated by arrows 255.

Figure 18:
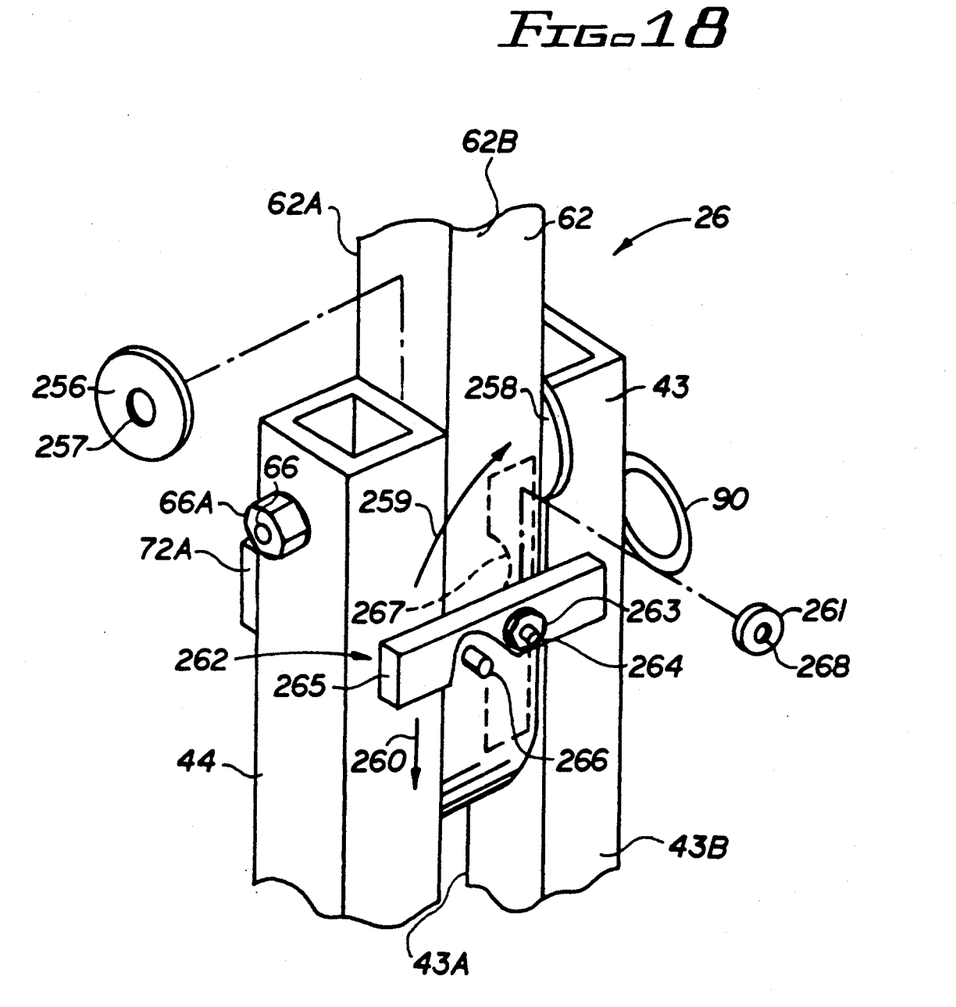
FIG. 18 is a perspective view illustrating a stop plate utilized in conjunction with the stop plate of FIG. 11.

FIG. 18 illustrates a pivoting, adjustable latch 262 which can be utilized in conjunction with a fixed stop plate like transverse stop plate 72 of FIGS. 2, 3 and 11. In FIG. 18, stop plate 72A is fixedly secured to leg 62 in the same manner that stop plate 72 is secured to leg 62 in FIG. 2. Nut 66A turns on to the externally threaded end of bolt 66. Externally threaded end 264 is fixedly secured in leg 62 and extends through an aperture formed through elongate panel member 265. Lock nut 263 turns onto end 264. Pin 266 is fixedly secured to leg 62. Oversized washer 258 is between legs 43 and 62. Bolt 66 passes through an aperture (not visible) formed through washer 258. If desired, a smooth fiber washer 256 can be positioned between legs 44 and 62 such that bolt 66 passes through aperture 257 of washer 256. A spring washer 261 is preferably positioned between panel member 265 and leg 62 such that end 264 passes through aperture 268 formed through washer 261. Washer 261 creates friction between member 265 and leg 62 so that member 265 remains in a selected position.

In use of the latch 262, panel member 265 is placed in the position illustrated in FIG. 18 when arm 26 is in its fully unfolded, extended position illustrated in FIG. 1. Before cover 24 is lowered from the position of FIG. 1 to the position of FIG. 3, member 265 is manually grasped and pivoted about member 264 to the position indicated by dashed lines 267 in FIG. 18. Once member 265 is in the position indicated by dashed lines 267, the fully extended arm 26 can be folded to the position of FIG. 3. When member 265 is in the position indicated by dashed lines 267, it butts up against washer 258. Washer 258 functions as a stop and prevents member 265 from being pivoted too great a distance in the direction of arrow 259. Before leg 26 is folded from the position in FIG. 1 to the position shown in FIG. 3, pin 90 is, of course, removed. After cover 24 is raised and arm 26 is extended from the position illustrated in FIG. 3 to the position illustrated in FIG. 1, then member 265 is manually grasped and pivoted about end 265 from the position indicated by dashed lines 267 to the position shown in FIG. 18. When member 265 is in the position shown in FIG. 18, member 265 prevents arm 26 from inadvertently folding and allowing the cover 24 to fall from the position illustrated in FIG. 1 to the position illustrated in FIG. 3.

Figure 19:
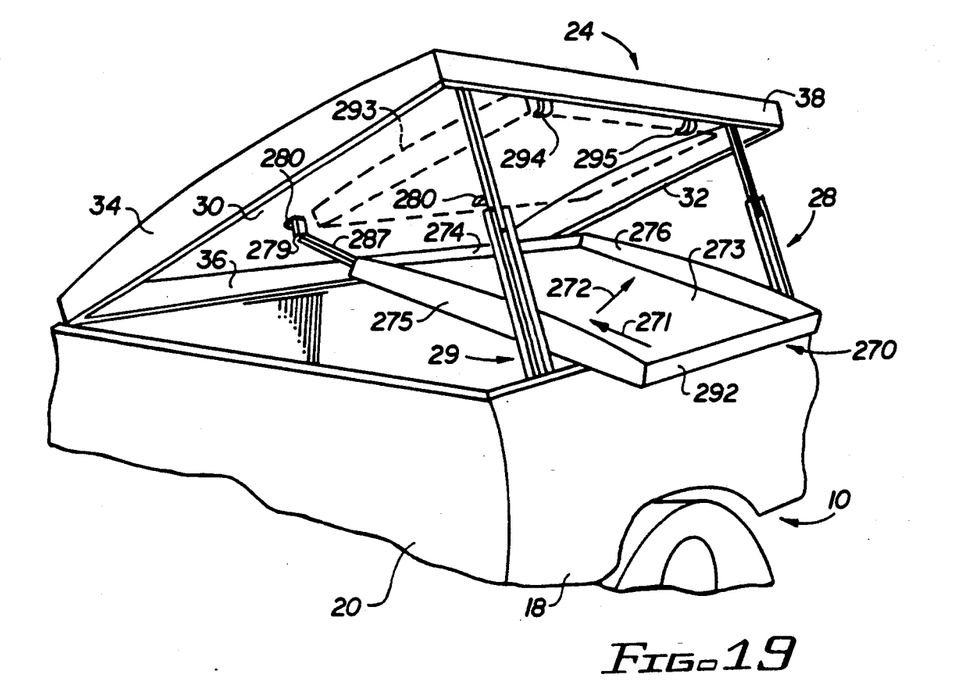
FIG. 19 is a perspective view illustrating a pull down desk used in still another embodiment of the invention.
Figure 20:
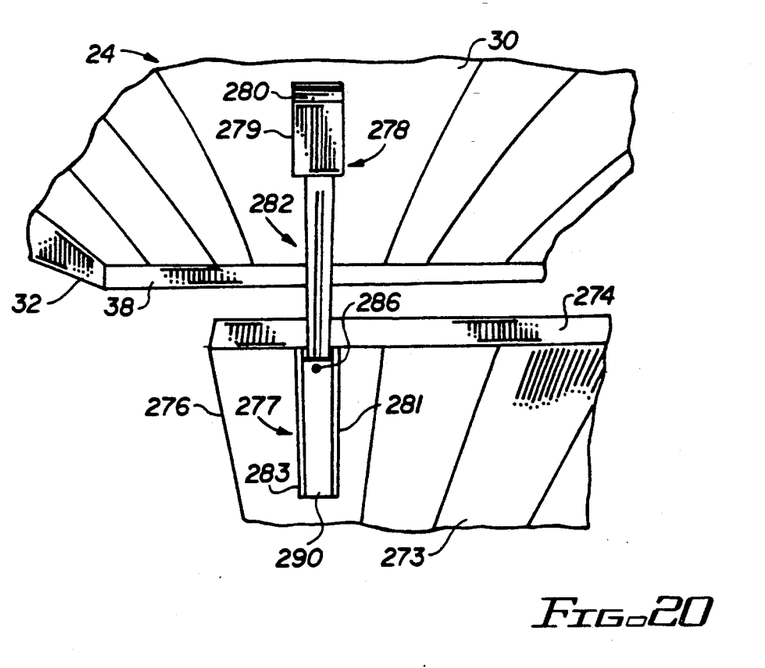
FIG. 20 is a rear view illustrating a bracket assembly used to attach the pull down desk of FIG. 19 to the underside of the vehicle cover of FIG. 1.
Figure 21:
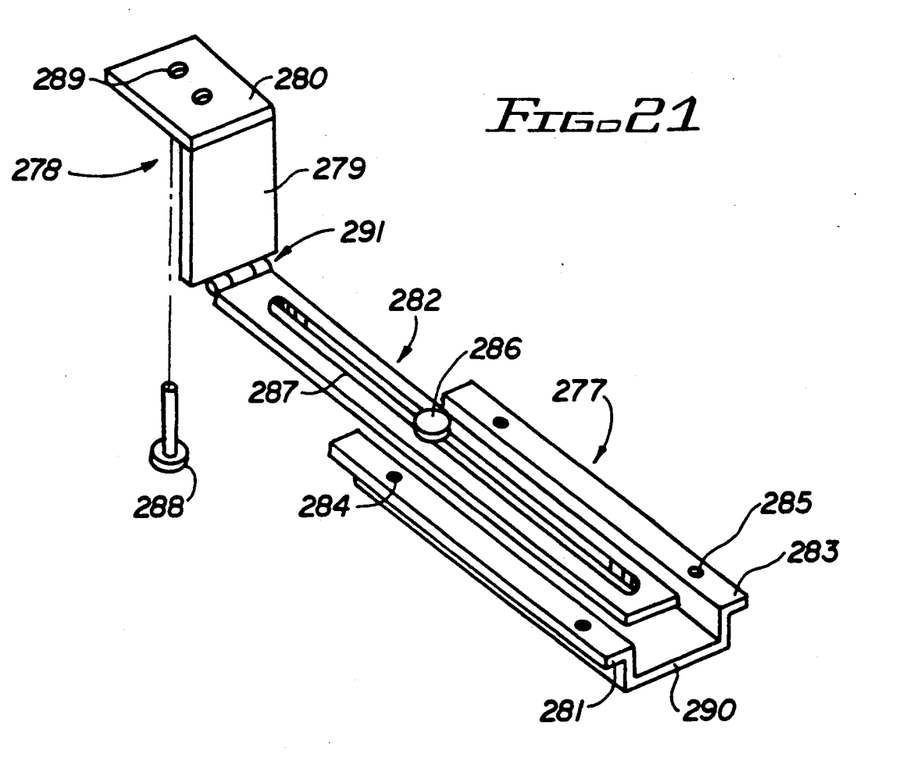
FIG. 21 is a perspective view of the bracket assembly of FIG. 20 illustrating further construction details thereof; and, FIG. 22 is a perspective view illustrating a tool box assembly utilized in the practice of the invention.

FIGS. 19 to 21 illustrate a pull down desk 270 which is attached to the underside of panel 30 by a pair of sliding bracket assemblies which each include fixed bracket 278, hinge 291, slotted plate 282, and slide member 277. Desk 270 includes bottom rectangular panel 273. Sides 275 and 276, lip 292, and back edge 274 upwardly depend from bottom panel 273. In FIG. 19, desk 270 is shown in its deployed position. As will be evident from the description of the bracket assembly which follows below, desk 270 is moved from its deployed position to a storage position be grasping lip 292, pushing desk 270 rearwardly in the direction of arrow 271, and then lifting desk 270 upwardly through an arc in the direction of arrow 272. When desk 270 is moved upwardly in the direction of arrow 272 to a position immediately beneath and against panel 30, spring steel clips 294, 295 snap around lip 292 and maintain desk 270 in the storage position indicated by dashed lines 293 in FIG. 19. Desk 270 is moved from its storage position to the deployed position by pulling clips 294, 295 outwardly to fee lip 292, by grasping lip 292 and lowering desk 270 through an arc in a direction opposite that of arrow 272, and by pulling desk 270 outwardly in a direction opposite that of arrow 271 to the position shown in FIG. 19.

Fixed bracket 278 includes flat rectangular plate 279 attached to curved plate 280. Plate 280 is shaped to conform to the curvature of the underside of panel 30. Bolts 288 pass through apertures 289 to fixedly secure plate 280 to the underside of panel 30 in the manner shown in FIGS. 19 and 20. Plate 282 is pivotally secured to plate 279 by hinge 291. Elongate slot 287 is formed in plate 282. U-shaped slide member 277 houses plate 282 and includes flanges 281, 283 and top member 290. Apertures 284 and 285 formed in flanges 281 and 283 receive bolts (not shown) which are used to secure slide member 277 to the underside of bottom panel 273 in the manner shown in FIG. 20. Pin 286 is fixedly secured to top member 290. The stem of pin 286 passes through slot 287. The round head of pin 286 is larger than and will not pass through slot 187. Consequently, when desk 270 is pushed in the direction of arrow 271 (FIG. 19) or is pulled in the opposite direction, pin 286 slides along slot 287. Slide member 277 is always fixedly secured to the underside of panel 273. Bracket 278 is always fixedly secured to the underside of panel 30.

In FIG. 19, one of the sliding bracket assemblies is nearly totally obscured by folding arm 29, with only the plate 280 being partially visible Desk 270 is shaped and dimensioned such that when the cover 24 is completely raised in the manner shown in FIG. 1 and desk 270 is deployed, lip 292 still extends outwardly over the top lip of side panel 18 in the manner shown in FIG. 19, or, so that lip 292 at least rests on the top lip of side panel 18. In FIG. 19, cover 24 only partially raised. Also, in FIGS. 19 and 20, folding arms 26 and 27 have, for the sake of clarity, been omitted from the drawings.

Figure 22:
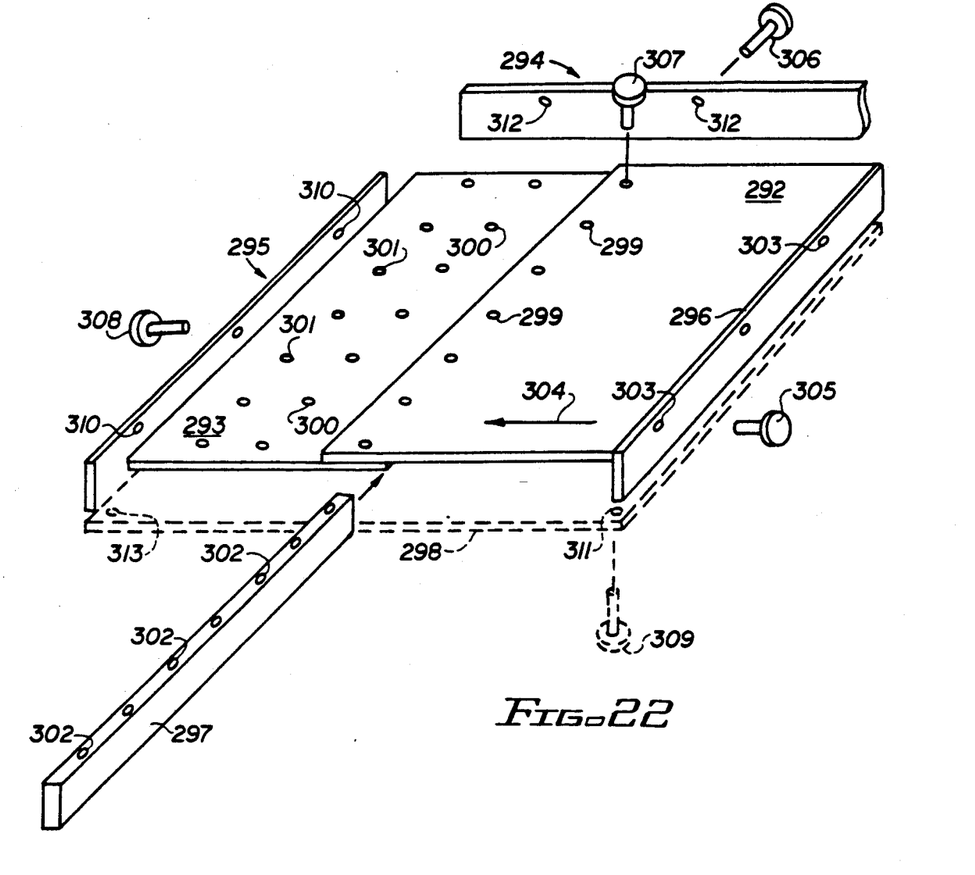

A storage assembly is illustrated in FIG. 22 and is shaped and dimensioned to slide and fit between the wheel wells of the bed of a pickup truck or to fit in any other desired portion of the bed of a truck. Panel member 292 includes a plurality of colinear holes 299 formed through member 292. Holes 299 are equally spaced. Panel member 293 includes three sets of colinear equally spaced holes. One set includes holes 300. A second set includes holes 301. The third set of holes is not visible in FIG. 22 because each of the holes is directly beneath and aligned with one of holes 299 in panel member 292. The distance between each adjacent pair of holes 301 equals the distance between each adjacent pair of holes 300 and between each adjacent pair of holes 299. Panels 292 and 293 are secured to one another with bolts 307 which extend through holes 299 and the holes in panel 293 which are aligned with holes 299. The total surface area covered by panels 292 and 293 is, before the panels are connected to one another by bolts 307, selected by pushing and sliding panel 292 over stationary panel 293 until holes 299 are over and aligned with one of the three sets of colinear holes formed through panel 293. If desired, panel member 297 can be positioned under holes 299 or holes 300 or holes 301 and affixed to panel 293 with bolts or screws 307. Side panel 295 is affixed to panel 293 with bolts 308 which pass through apertures 310 into the edge of panel 293. Side panel 296 is affixed to panel 292 with bolts 305 which pass through apertures 303 into the edge of panel 292. Back panel 294 is affixed to panels 292 and 293 with bolts 306 which pass through apertures 312 into the edges of panels 292 and 293. A bottom panel 298 can be affixed to the lower edges of panels 295, 297 and 296 with bolts or screws 309 which pass through apertures 311, 313 formed through panel 298. The particular advantages of the storage assembly of FIG. 22 are that the panels 292 and 293 can be slid over one another to adjust the size of the storage assembly and that partition 297 can be placed at any of several locations to alter the size of storage compartments in the storage assembly.

In FIGS. 2, 3, and 18, arm 62 includes outer surface 62B and inner surface 62A, while arm 43 includes outer surface 43B and inner surface 43A. Inner surfacess 43A and 62A face the bed of the pickup truck when arms 43 and 62 are in the extended position shown in FIG. 1. Outer surfaces 43B and 62B face outwardly away from the bed of the pickup truck when arms 43 and 62 are in the extended position shown in FIG. 1.

Having described my invention in such terms as to enable those skilled in the art to understand and practice it, and having identified the presently preferred embodiments thereof, I claim:

1. A vertically extendible cover assembly for use on the bed of a pickup truck, said bed having an upper ledge means, said cover assembly comprising, in combination:

(a) a rigid cover;

(b) a plurality of folding arms each having a lower base leg and an upper extending leg, said legs each including an upper end and a lower end, said upper end of said base leg being pivotally attached to said lower end of said extending leg;

(c) means attached to each of said lower ends of said base legs to pivotally attach said lower ends to said upper ledge means of said pickup truck bed;

(d) mounting means for pivotally securing said upper end of at least one of said extending legs to said cover, said mounting means including (i) bracket means including a slot and fixedly attached to said cover to slidably receive said upper end of one of said extending legs to permit said upper end of said one of said extending legs to be slidably laterally positioned at a selected position in said bracket means, said slot having a longitudinal axis, and, (ii) attachment means for slidably moving said upper end of said one of said extending legs along said bracket means and for releasably securing said upper end of said one of said extending legs in said bracket means in said selected position, said attachment means including a control plate adjacent said bracket means and having at least first and second spaced apart apertures formed therethrough, first fastening means connected to said upper end of said one of said extending legs and extending outwardly from said upper end of said one of said extending legs through said first aperture and said slot, second fastening-anchor means extending through said second aperture and said slot and spaced apart from said upper end of said one of said extending legs, means for tightening said first fastening means and said second fastening-anchor means such that said plate, said first fastening means, said second fastening-anchor means, and said upper end of said one of said extending legs are releasably secured with respect to said bracket means, and loosening said first fastening means and second fastening-anchor means such that said plate, said first fastening means and second fastening-anchor means, and said upper end of said one of said extending legs can be simultaneously displaced with respect to said bracket means in a direction of travel generally parallel to said longitudinal axis of said slot, and said first fastening means and said second fastening-anchor means can simultaneously slide along said slot;

each of said folding arms being movable between first and second operative positions when said attachment means releasably secures said upper end of said one of said extending legs in said selected position, (e) a first operative folded position with said cover in a lowered position on said pickup bed with said legs extending from said ledge means inwardly into said pickup truck bed, and (f) a second operative unfolded extended position with said cover raised from said pickup truck bed and said legs extending from said ledge means upwardly to said cover.

2. A vertically extendible cover assembly for use on the bed of a pickup truck, said bed having an upper ledge means, said cover assembly comprising, in combination:

(a) a rigid cover;

(b) a plurality of folding arms each having a lower base leg and an upper extending leg, said legs each including an upper end and a lower end, said upper end of said base leg being pivotally attached to said lower end of said extending leg;

(c) means attached to each of said lower ends of said base legs to attach said lower ends to said upper ledge means of said pickup truck bed;

(d) mounting means for securing said upper end of at least one of said extending legs to said cover, said mounting means including (i) bracket means including a slot and fixedly attached to said cover to slidably receive said upper end of said one of said extending legs to permit said upper end of said one of said extending legs to be slidably laterally positioned at a selected position in said bracket means, said slot having a longitudinal axis, (ii) attachment means for slidably moving said upper end of said one of said extending legs along said bracket means and for releasably securing said upper end of said one of said extending legs in said bracket means in said selected position, said attachment means including a plate adjacent said bracket means and having at least first and second spaced-apart apertures formed therethrough, first fastening means connected to said upper end of said one of said extending legs and extending outwardly from said upper end of said one of said extending legs through said first aperture and said slot, second fastening-anchor means extending through said second aperture and said slot;

(e) spring means having a lower end attached to said lower end of said one of said extending legs and an upper end attached to said second fastening-anchor means;

(f) means for (i) tightening said second fastening-anchor means such that said plate, said first fastening means, said second fastening-anchor means, and said upper end of said one of said extending legs are fixedly secured with respect to said bracket means, and (ii) loosening said second fastening-anchor means such that said plate, said spring means, said first fastening means, said second fastening-anchor means, and said upper end of said one of said extending legs can be simultaneously displaced with respect to said bracket means in a direction of travel generally parallel to said longitudinal axis of said slot, and said first fastening means and said second fastening-anchor means can simultaneously slide along said slot;

each of said folding arms being movable between first and second operative positions when said attachment means releasably secures said upper end of said one of said extending legs in said selected position, (h) a first operative folded position with said cover in a lowered position on said pickup bed with said legs extending from said ledge means inwardly into said pickup truck bed, and (i) a second operative unfolded extended position with said cover raised from said pickup truck bed and said legs extending from said ledge means upwardly to said cover.

3. A vertically extendible cover assembly for use on the bed of a pickup truck, said bed having an upper ledge means, said cover assembly including, in combination (a) a rigid cover;

(b) a folding arm having a lower base leg and an upper extending leg, said legs each including an upper end and a lower end, said upper end of said base leg being pivotally attached to said extending leg at a point above said lower end of said extending leg, said lower end and upper end of each leg including outer and inner opposing surfaces;

(c) means attached said lower end of said base leg to pivotally attach said lower end of said base leg to said upper ledge means of said pickup truck means;

(d) mounting means for pivotally securing said upper end of said extending leg to said cover, said mounting means including (i) bracket means including a slot and fixedly attached to said cover to slidably receive said upper end of said extending leg to permit said upper end of said extending leg to be slidably laterally positioned at a selected position in said bracket means, said slot having a longitudinal axis, and, (ii) attachment means for slidably moving said upper end of said extending leg along said bracket means and for releasably securing said upper end of said extending leg in said bracket means in said selected position, said attachment means including a plate adjacent said bracket means and having at least a first and a second aperture formed therethrough, first fastening means connected to said upper end of said extending leg and extending outwardly from said upper end of said extending leg through said first aperture and said slot, second fastening-anchor means extending through said second aperture and said slot and spaced apart from said upper end of said extending leg, means for tightening said first fastening means and second fastening-anchor means such that said plate, said first fastening means and second fastening-anchor means, and said upper end of said extending leg are releasably secured with respect to said bracket means, and loosening said first fastening means and second fastening-anchor means such that said plate, said first fastening means and second fastening-anchor means, and said upper end of said extending leg can be simultaneously displaced with respect to said bracket means in a direction of travel generally parallel to said longitudinal axis of said slot, and said first fastening means and said second fastening-anchor means can simultaneously slide along said slot;

(e) first stop plate means attached to said outer surface of said lower end of said extending leg;

(f) second stop plate means attached to said inner surface of said lower end of said extending leg;

said folding arm being movable between at least two operative positions, (g) a first operative position with said cover in a lowered position on said pickup bed and with said arm extending from said ledge means inwardly into said pickup truck bed; and (h) a second operative unfolded extended position with said cover raised from said pickup truck bed and said arm extending from said ledge means upwardly to said cover, said outer surface of said extending leg moving by said inner surface of said base leg and to a position adjacent said outer surface of said base leg when said arm moves from said first operative position to said second operative position, said outer surfaces facing away from the bed of the pickup truck and said inner surfaces facing the bed of the pickup truck when said folding arm is in said second operative position;

said second stop plate means being movable between at least two operative positions, (i) a first storage position with said second stop plate means positioned adjacent said inner surface of said lower end of said extending leg such that said outer surface of said lower end of said extending leg can, when said folding arm moves from said first operative folded position to said second operative unfolded extended position, move by said inner surface of said upper end of said base leg until said inner surface of said lower end of said extending leg is aligned with said inner surface of said upper end of said base leg; and, (j) a second deployed position with said second stop plate means moved from said first storage position to a position with said second plate means extending from said inner surface of said extending leg over and adjacent said inner surface of said base leg, said second plate means preventing said folding arm from being moved beyond said first operative folded position;

said first stop plate means, when said arm is in second operative position, (k) contacting said outer surface of said base leg; and, (l) preventing said extending leg from pivoting with respect to said base leg such that said outer surface of said lower end of said extending leg moves toward said inner surface of said upper end of said base leg.

* * * * *